United States Patent
Donovan et al.

(10) Patent No.: US 7,607,138 B2
(45) Date of Patent: Oct. 20, 2009

(54) SYSTEM AND METHOD FOR OPTIMIZING INTER-DOMAIN EVENT SERVICES

(75) Inventors: Steven R. Donovan, Plano, TX (US);
Ben A. Campbell, Irving, TX (US);
Adam B. Roach, Dallas, TX (US);
Robert J. Sparks, Plano, TX (US); Ajay P. Deo, Lewisville, TX (US)

(73) Assignee: Cisco Technology, Inc., San Jose, CA (US)

( * ) Notice: Subject to any disclaimer, the term of this patent is extended or adjusted under 35 U.S.C. 154(b) by 675 days.

(21) Appl. No.: 11/154,974

(22) Filed: Jun. 15, 2005

(65) Prior Publication Data
US 2005/0283477 A1 Dec. 22, 2005

Related U.S. Application Data

(60) Provisional application No. 60/521,690, filed on Jun. 17, 2004.

(51) Int. Cl.
G06F 9/44 (2006.01)
G06F 15/173 (2006.01)

(52) U.S. Cl. ........................... 719/318; 709/224
(58) Field of Classification Search ................. 719/310, 719/318, 313; 709/208, 220, 223, 224, 227, 709/229; 707/8
See application file for complete search history.

(56) References Cited

U.S. PATENT DOCUMENTS

| 6,366,926 | B1 * | 4/2002 | Pohlmann et al. ......... 707/104.1 |
|---|---|---|---|
| 6,725,281 | B1 * | 4/2004 | Zintel et al. ................. 719/318 |
| 6,748,455 | B1 * | 6/2004 | Hinson et al. ............... 719/318 |
| 6,751,657 | B1 * | 6/2004 | Zothner ....................... 709/220 |
| 6,779,004 | B1 * | 8/2004 | Zintel .......................... 709/227 |
| 6,829,770 | B1 * | 12/2004 | Hinson et al. ............... 719/318 |
| 6,886,170 | B1 * | 4/2005 | Bahrs et al. ................. 719/318 |
| 6,892,230 | B1 * | 5/2005 | Gu et al. ...................... 709/220 |
| 6,910,068 | B2 * | 6/2005 | Zintel et al. ................. 709/220 |
| 7,085,814 | B1 * | 8/2006 | Gandhi et al. ............... 709/208 |
| 7,089,307 | B2 * | 8/2006 | Zintel et al. ................. 709/224 |
| 7,120,628 | B1 * | 10/2006 | Conmy et al. ................... 707/4 |
| 7,254,579 | B2 * | 8/2007 | Cabrera et al. ................ 707/10 |
| 7,373,410 | B2 * | 5/2008 | Monza et al. ............... 709/229 |
| 2001/0047411 | A1 * | 11/2001 | Kurose et al. ............... 709/225 |
| 2003/0088620 | A1 * | 5/2003 | Kermarrec et al. .......... 709/204 |

(Continued)

OTHER PUBLICATIONS

Chadayammuri "A Platform for Building Integrated Telecommunications Network Management Applications", 1996, pp. 1-10.*

(Continued)

*Primary Examiner*—Van H Nguyen
(74) *Attorney, Agent, or Firm*—Baker Botts L.L.P.

(57) ABSTRACT

Event services provided between domains include receiving a first subscription request to receive an event state of an event source. A view associated with the first subscription request is determined. A notify message is sent that reflects a first defined view into the event state of the event source that corresponds to the first subscription request. A second subscription request is received to receive the event state of the event source. A view associated with the second subscription request is determined. It is determined if the first defined view corresponds to the second subscription request.

24 Claims, 5 Drawing Sheets

U.S. PATENT DOCUMENTS

2004/0153533 A1* 8/2004 Lewis .................... 709/223

OTHER PUBLICATIONS

Meier "State Of The Art Review Of Distributed Event Models", 2000, 64 pages.*

Anerousis "A Distributed Computing Environment For Building Scalablemanagement Services", 1999 IEEE, pp. 547-562.*

A.B. Roach, J. Rosenberg, and B. Campbell, "A Session Initiation Protocol (SIP) Event Notification Extension for Resource Lists" draft-ietf-simple-event-list-04, Network Working Group, Internet-Draft, 42 pgs, Jun. 2003.

T. Berners-Lee, R. Fielding, U.C. Irvine, L. Masinter, Uniform Resource Identifiers (URI): Generic Syntax, Network Working Group, RFC 2396, Updates: 1808, 1738, 40 pgs, Aug. 1998.

J. Rosenberg, H. Schulzrinne, G. Camarillo, A. Johnston, J. Peterson, R. Sparks, M. Handley, and E. Schooler, "SIP: Session Initiation Protocol," Network Working Group, RFC 3261, Obsoletes: 2543, 269 pgs, Jun. 2002.

A.B. Roach, "Session Initiation Protocol (SIP)—Specific Event Notification," Network Working Group, RFC 3265, Updates: 2543, 38 pgs, Jun. 2002.

J. Rosenberg, A Presence Event Package for the Session Initiation Protocol (SIP), draft-ietf-simple-presence-10.txt, Internet Engineering Task Force (IETF), 27 pgs, Jan. 31, 2003.

P. Saint-Andre, Extensible Messaging and Presence Protocol (XMPP): Instant Messaging and Presence, draft-ietf-xmpp-im-22, XMPP Working Group, 109 pg.s, Apr. 12, 2004.

3GPP™, 3rd Generation Partnership Project; Technical Specification Group Services and System Aspects; Presence Service; Architecture and functional description (Release 6), 3GPP TS 23.141 V.6.7.0, 34 pgs, Sep. 2004.

* cited by examiner

SYSTEM AND METHOD FOR OPTIMIZING INTER-DOMAIN EVENT SERVICES

RELATED APPLICATION

This Application claims the benefit under 35 U.S.C. § 119(e) of U.S. Provisional Application Ser. No. 60/521,690 entitled: "Mechanism for Optimization of Interdomain Event Services Using Shared Subscriptions and Notifications," filed on Jun. 17, 2004 and incorporated by reference herein.

TECHNICAL FIELD OF THE INVENTION

This invention relates generally to the field of communications and more specifically to a system and method for optimizing inter-domain event services.

BACKGROUND

System users interact and communicate using various types of devices such as desktop computers, laptop computers, personal digital assistants, desktop phones, cell phones, and other devices. Systems and methods have been developed to determine whether certain system users are connected to a network and available for communication through one or more of those network devices. Generally, knowledge of a system user's network status and availability is referred to as "presence."

Presence information can be exchanged between users in different systems or domains. When a user changes their state, a notification is sent to the user desiring to receive presence information. If a system includes many users that subscribe to receive presence information from a single user, the same presence information notifications are sent continuously to a server that manages the users desiring to receive the presence information. The continuous passing of presence information results in significant system overhead.

SUMMARY OF THE DISCLOSURE

From the foregoing, it may be appreciated by those skilled in the art that a need has arisen for an improved system and method for inter-domain event services. In accordance with the present invention, disadvantages and problems associated with conventional inter-domain event services may be reduced or eliminated.

According to one embodiment of the present invention, optimizing inter-domain event services includes receiving a first subscription request to receive an event state of an event source. A view associated with the first subscription request is determined. A notify message is sent that reflects a first defined view into the event state of the event source that corresponds to the first subscription request. A second subscription request is received to receive the event state of the event source. A view associated with the second subscription request is determined. It is determined if the first defined view corresponds to the second subscription request.

Certain embodiments of the invention may provide one or more technical advantages. A technical advantage of one embodiment includes aggregating multiple and redundant subscriptions to a lesser number of subscriptions. Decreasing the number of subscriptions provides a reduction in the subscription and notification load between the systems involved. In a system that uses servers to facilitate event traffic, messaging overhead between the servers responsible for the event space is also reduced. Overlap and/or redundancy of event traffic are effectively eliminated when there are multiple subscriptions from one domain to one or more users in another domain. Another technical advantage of another embodiment includes providing for the full expressivity of individual subscriptions for such things as authorization, filtering, and the additional limitations categorized as views of the presence data. The optimization ensures that a user's authorization policy and watcher information service operate correctly.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, wherein like reference numerals represent like parts, in which.

DETAILED DESCRIPTION OF THE DRAWINGS

Figure 1:
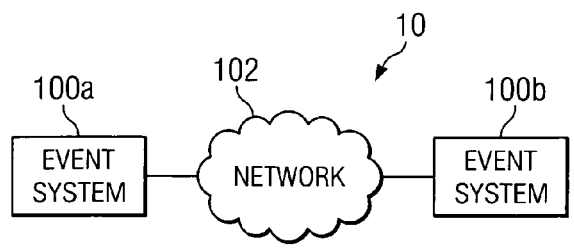
FIG. 1 illustrates a network that provides for event service subscriptions and notifications between event systems.

FIG. 1 illustrates a network 10 that provides for event service subscriptions and notifications between event systems 100. Network 10 includes event systems 100a and 100b that facilitate event service subscriptions and notifications within event system 100a and interactively with another event system 100b. Event systems 100 may communicate using transport network 102.

Event system 100 generates, maintains, and/or disseminates information relating to the event state of one or more users within network 10. The event state information of a user includes information, such as presence information, which is transmitted asynchronously from one user to another. Presence information may include any suitable information that describes the location of the relevant user, the availability of that user, the reachability of the user, and/or preferred modes of communication for the user for the purposes of communicating with other users. Examples of presence information include, but are not limited to, information indicating whether a user is currently logged into a particular network or component, information identifying a wireless network in which the user is currently located, information indicating whether the user has used a particular component of network 10 within a predetermined time period, information identifying an activity presently scheduled for the user, and information specifying a physical location of the user.

Transport network 102 allows event systems 100 to communicate with each other. Transport network 102 may include a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Transport network 102 may include any combination of gateways, routers, hubs, switches, access points, base stations, and any other hardware and/or software that may implement any suitable protocol or communication.

In operation, event system 100a includes users that may desire to subscribe to receive event state information from users in event system 100b, or vice versa. Transport network 102 facilitates the communication of event state information between event system 100b and event system 100a. For example, multiple users within event system 100a may desire to receive event state information from a user in event system 100b. In this example, network 10 aggregates the subscriptions of the multiple users within event system 100a to reduce the messaging overhead between event systems 100.

Modifications, additions, or omissions may be made to network 10 without departing from the scope of the invention. For example, network 10 may include any suitable number of event systems 100 that communicate the event state information of users to other users. As another example, event system 100 that provides event state information may include enterprises, service providers, servers in a cluster, clusters in a domain, domains of a service provider's deployment, any suitable applicable system, and/or any combination of the preceding. Event system 100 may use any suitable logic, and the logic may be embodied on a computer readable medium. As in the illustrated embodiment, the management of event state information often is partitioned for administrative control and scope. In a partitioned network 10, users in one event system 100 may subscribe to the event state information of a user in another event system 100. The aggregation of subscriptions in partitioned network 10 supports multiple, redundant subscriptions occurring in parallel.

Figure 2:
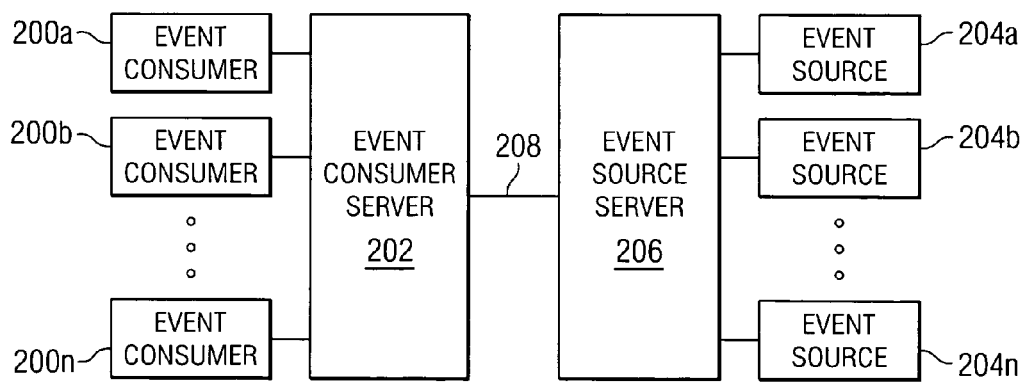
FIG. 2 illustrates an event system in the network.

FIG. 2 illustrates an event system 100 in network 10. Event system 100 includes users that behave as event consumers 200 and/or event sources 204. Event consumers 200 desire to receive event state information about event sources 204. Event consumer server 202 and event source server 206 facilitate the communication of subscriptions and notifications regarding event states between event consumers 200 and event sources 204. The traffic between event consumer server 202 and event source server 206 traverse link 208. In an embodiment, the information flow in event system 100 is from event source 204 to event source server 206 to event consumer server 202 to event consumer 200. Event system 100 may support any suitable protocol that allows for event state information to be exchanged between event consumer 200 and event source 204. Such protocols include, but are not limited to, Extensible Messaging and Presence Protocol (XMPP) and Session Initiation Protocol for Instant Messaging and Presence Leveraging Extensions (SIMPLE).

Event consumers 200 send subscription requests to receive the event state information of event source 204. Event consumers 200 may be any suitable entity, user, or application that desires to track the event state of event source 204, such as a watcher. In the illustrated embodiment, event consumer 200 delegates the retrieval of the event state information of event source 204 to event consumer server 202.

Event consumer server 202 enables event consumers 200 to subscribe to event sources 204. Upon receiving a subscription request from event consumer 200, event consumer server 202 forwards the subscription request to event source 204 or to event source server 206, which handles the event service for event source 204. Event consumer server 202 stores subscriptions and/or notifications on behalf of event consumers 200, manages subscriptions and/or notifications on behalf of event consumers 200, passes subscription requests on to the corresponding event source 204 or event source server 206 for fulfillment, and/or any other suitable action that facilitates the communication between elements within event system 100.

Event sources 204 generate event state information, such as presence information. Event sources 204 publish event state information to event source server 206. Event sources 204 include an authorization policy that controls which event consumers 200 may subscribe to the event state of event source 204. The authorization policy of event source 204 includes a filter that controls which portion of the event state information an event consumer 200 is allowed to see. The exchange of event state information allows for the authorization policy to apply to each event consumer 200 that requests access to the event state information, even though a server facilitates communication. The authorization policy applies in the same fashion for server-to-server based subscriptions as it does for direct client-to-server based subscriptions. Event source 204 may be any suitable entity, user, or application that has event state information to which event consumers 200 may subscribe, such as a presentity.

Event source server 206 enables event source 204 to provide event state information to event consumers 200. Event source server 206 stores the event state information of event source 204 and sends notifications to any event consumers 200 that have an active subscription to the published event state. In an embodiment, event source server 206 has access to the authorization policy of event source 204.

Link 208 provides the connection between event consumer server 202 and event source server 206 that allows traffic between event consumers 200 and event sources 204 to traverse. Link 208 is any suitable common link between event consumer server 202 and event source server 206, between domains, or between any suitable elements in event system 100 or network 10. Using a common link 208 allows for the redundancy of messages traversing link 208 to be reduced.

In operation, event consumer 200a sends a subscription request to subscribe to the event state of event source 204a. Event consumer 200a may subscribe to a particular view based on the authorization policy of event source 204a and the subscription request of event consumer 200a. Event consumer 200b also subscribes to the event state of event source 204a. Event consumer 200b may subscribe to a particular view based on the authorization policy of event source 204a and the subscription request of event consumer 200b. If the views of event consumer 200a and 200b match, event source server 206 sends a notify message reflecting the view of event source 204a to event consumer server 202. Having matching views includes each event consumer 200 having the same stream of event notifications. For example, if event consumer 200a has a view that provides event state information regarding the log-in status of event source 204a and event consumer 200b also subscribes to view the log-in status of event source 204a, the view of event consumer 200a is reused for event consumer 200b. Event consumer server 202 distributes the notify message to event consumers 200 having an active subscription to the view. Therefore, event source server 206 sends a single notify message instead of re-sending several notify messages that reflect the same view.

If event consumer 200a and event consumer 200b do not share matching views, event source server 206 sends separate notify messages to event consumer server 202 that reflect the different views of event consumer 200a and event consumer 200b. For example, if event consumer 200a has a view into the log-in status of event source 204a, but event consumer 200b has a view into the meeting status of event source 204a, the views do not match.

Modifications, additions, or omissions may be made to event system 100. For example, event system 100 may include any suitable number of event consumer servers 202 and event source servers 206. In an embodiment, the information of event source 204 is distributed across different event source servers 206 instead of distributing all event source 204 information to each event source server 206. As another example, each event consumer server 202 may handle one or more event consumers 200, and each event source server 206 may handle one or more event sources 204. As a further example, event consumer 200 may subscribe to a single event source 204 or to a set of event sources 204. When event consumer 200 subscribes to a set of event sources 204, event consumer server 202 may maintain the set of event sources 204 and event consumer server 202 initiates individual subscriptions to each event source 204 in the set. Another example includes event consumers 200 and event consumer server 202 using subscription lists instead of individual subscriptions toward event sources 204. For example, event consumer 200a may include event sources 204a and 204b on a subscription list rather than individually subscribing to each event source 204. Subscription lists include a list of universal resource indicators indicating event sources 204 to which event consumers 200 may subscribe or express other interest.

Figure 3:
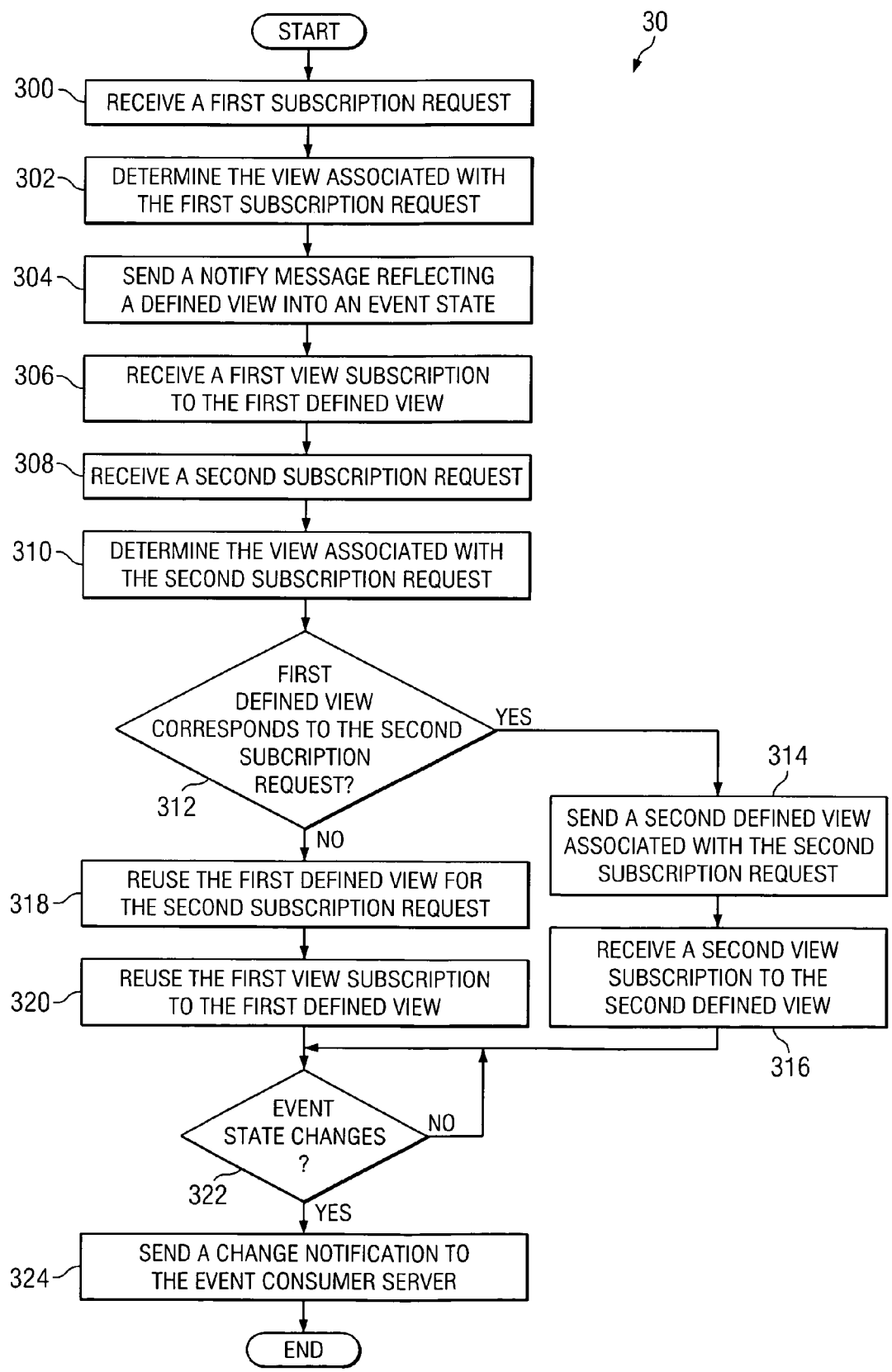
FIG. 3 is a flowchart illustrating an example of how event service subscriptions and notifications are provided.

FIG. 3 is a flowchart 30 illustrating an event system 100 that provides event service subscriptions and notifications. Event source server 206 receives a first subscription request from event consumer 200a at step 300 to subscribe to an event state of event source 204a. The view associated with the first subscription request is determined at step 302. Event source server 206 sends a notify message reflecting a defined view into the event state at step 304. The notify message may be based on the subscription request of event consumer 200, the authorization policy of event source 204, or a combination of the preceding. Event consumer server 202 subscribes to the first defined view, on behalf of event consumer 200a, by sending a first view subscription to event source server 206 at step 306 and receives event state information.

Event source server 206 receives a second subscription request from event consumer 200b at step 308 to subscribe to an event state of event source 204a. At step 310, event source server 206 determines the view associated with the second subscription request. Event source server 206 determines whether the first defined view corresponds to the second subscription request at step 312. If the first defined view and the second subscription request do not correspond, event source server 206 sends a second defined view associated with the second subscription request to event consumer 200b at step 314. Event source server 206 receives a second view subscription to the second defined view at step 316.

If the first defined view and the second subscription request correspond, event source server 206 reuses the first defined view for the second subscription request at step 318. Event source server 206 also reuses the first view subscription to the first defined view for event consumer 200b at step 320.

At step 322, event source server 206 determines whether the event state of event source 204 changes. If the event state changes, event source server 206 sends a change notification to event consumer server 202 at step 324, which forwards the notification to event consumers 200 having active subscriptions affected by the change notification. In an alternative embodiment, event source server 206 may be configured to collect event state changes over a configurable time interval instead of sending a change notification each time the event state changes. In this embodiment, event source server 206 aggregates the change notification to include a view identifier. Event source server 206 sends the aggregated change notification to event consumer server 202 for distribution among event consumers 200 with active subscriptions to the defined view. Additionally, event source server 206 may use a compression algorithm to reduce the size of the aggregated notification payload when sending the change notifications to event consumer server 202.

Figure 4:
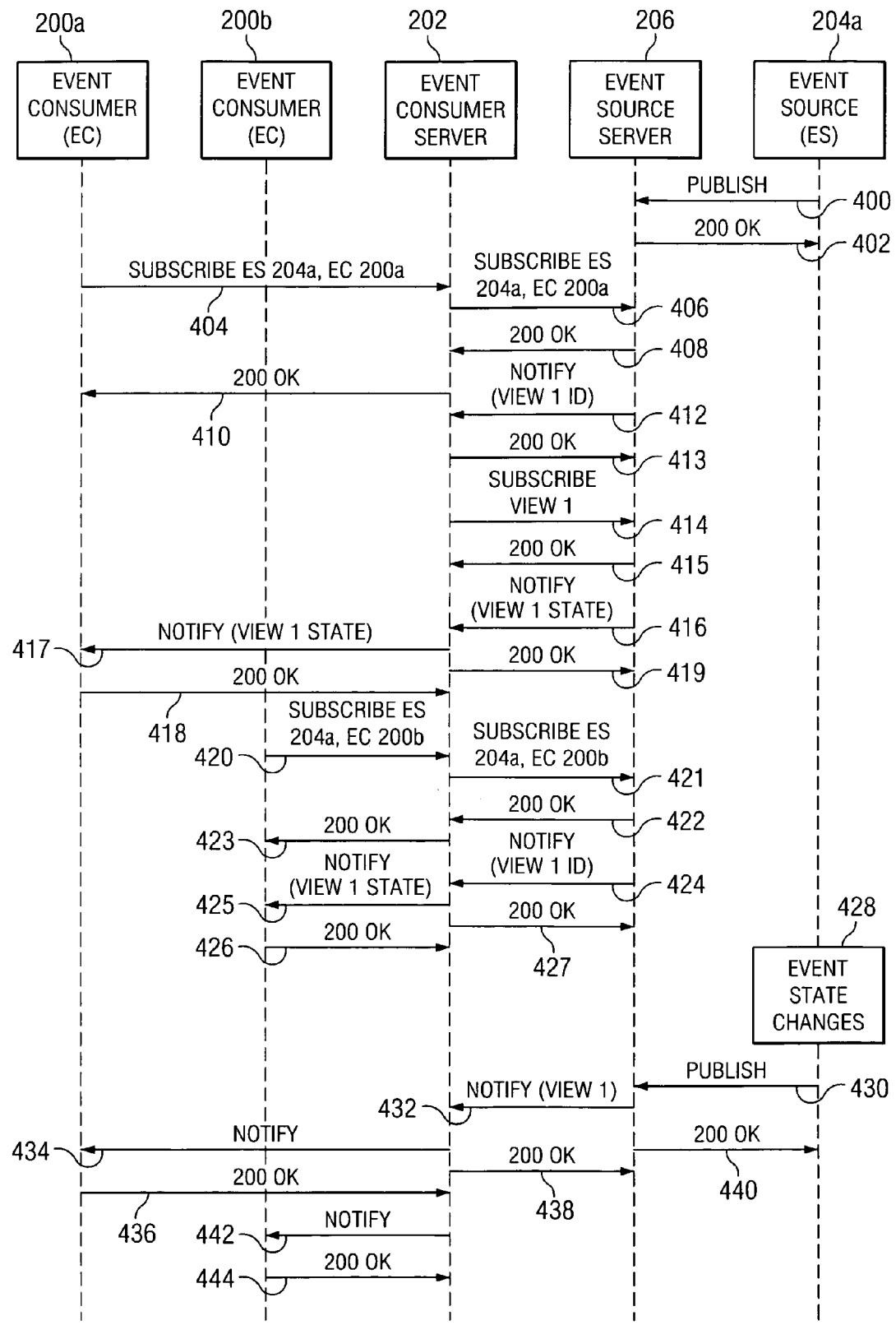
FIG. 4 is a call-flow diagram that illustrates shared subscriptions between multiple event consumers.

FIG. 4 is a call-flow diagram that illustrates shared subscriptions between multiple event consumers. The call-flow may use any signaling protocol to communicate, such as a subscription dialog as the signaling relationship. A subscription dialog starts with a SUBSCRIBE request and terminates when the subscription expires based on the expiration time included in the SUBSCRIBE request.

Event source 204a publishes its event state information to event source server 206 at message 400. Event source server 206 confirms the publication by sending a 200OK to event source 204a at message 402. Event consumer 200a desires to receive event state information about event source 204a and sends a subscription request to event consumer server 202 at message 404. Event consumer server 202 forwards the subscription request to event source server 206 at message 406. The subscription request includes the identity of event consumer 200a and event source 204a. The subscription that occurs from the subscription request is confirmed when event source server 206 forwards the 200OK to event consumer server 202 at message 408, and event consumer server 202 sends a 200OK to event consumer 200a at message 410. If event consumer 200a is authorized to see the event state of event source 204a, event source server 206 defines a view into the event state of event source 204a and sends a notify message reflecting a view of event source 204a to event consumer server 202 at message 412. The view is a stream of event state notifications resulting from the application of the authorization policy of event source 204a to a subscription. The view includes a view identifier of a particular view of event source 204a, which is included in all subsequent notifications of event source 204a when the event state changes. The view identifier may be a universal resource identifier (URI). Event consumer server 202 confirms the notify message by sending a 200OK at message 413 and sends a view subscription request at message 414. The view subscription request allows event consumer 200 to subscribe to a particular view of event source 204a. Event source server 206 confirms the view subscription at message 415 and sends a notify message that includes the state of event source 204a to event consumer server 202 at message 416. Event consumer server 202 transmits the notify message to event consumer 200a at message 417. Event consumer 200a confirms the notify message by sending a 200OK to event consumer server 202 at message 418. Event consumer server 202 sends the 200OK to event source server 206 at message 419.

Event consumer 200b sends a subscription request to event consumer server 202 at message 420, which forwards the subscription request to event source server 206 at message 421. The subscription request includes the identity of event consumer 200b. Event source server 206 determines if event consumer 200b is authorized for the service and if there is a matching view for event source 204a that event consumer 200b desires to see. In the illustrated embodiment, a matching view exists and event source server 206 confirms the subscriptions by sending a 200OK to event consumer server 202 at message 422, which forwards the 200OK to event consumer 200b at message 423. Event source server 206 also sends a notify message to event consumer server 202 that includes the view identifier at message 424, and event consumer server 202 sends a notify message reflecting the event state of event source 204a to event consumer 200b at message 425. In an alternative embodiment, event consumer server 202 may determine whether a view exists of event source 204a that matches the subscription request of event consumer 200b. In this embodiment, messages 421, 422, 424, and 427 may be eliminated. Event consumer 200b confirms the notify message by sending a 200OK to event consumer server 202 at message 426, which forwards the 200OK to event source server 206 at message 427. If there is no matching view, event source server 206 creates a new view and returns a view identifier that applies to the subscription of event consumer 200b.

At instance 428, the event state of event source 204a changes. Event source 204a publishes the event state change to event source server 206 at message 430. Event source server 206 sends the notify message that include the view identifier of the changed event state to event consumer server 202 at message 432. Upon receipt of the notify message, event consumer server 202 determines which active subscriptions should receive the notify message. In the illustrated embodiment, the same view applies to event consumers 200a and 200b. When event consumer server 202 receives the notify message for the view, it originates separate notify messages for each event consumer 200 subscribed to that view. Event consumer server 202 sends a notify message to event consumer 200a at message 434. Event consumer 200a confirms the notify message by sending a 200OK to event consumer server 202 at message 436. Event consumer server 202 forwards the 200OK to event source server 206 at message 438. Event source server 206 sends the 200OK to event source 204a at message 440. Event consumer server 202 also notifies event consumer 200b of the event state change because event consumer 200b is subscribed to the same defined view. Therefore, event consumer server 202 sends a notify message to event consumer 200b at message 442. The notify message is confirmed by sending a 200OK to event consumer server at message 444.

The original subscriptions from event consumers 200a and 200b to event source 204a still exist even when the event state changes. If event source 204a changes its authorization or filtering policy, the original subscriptions from event consumers 200a and 200b are used to communicate the change.

Figure 5:
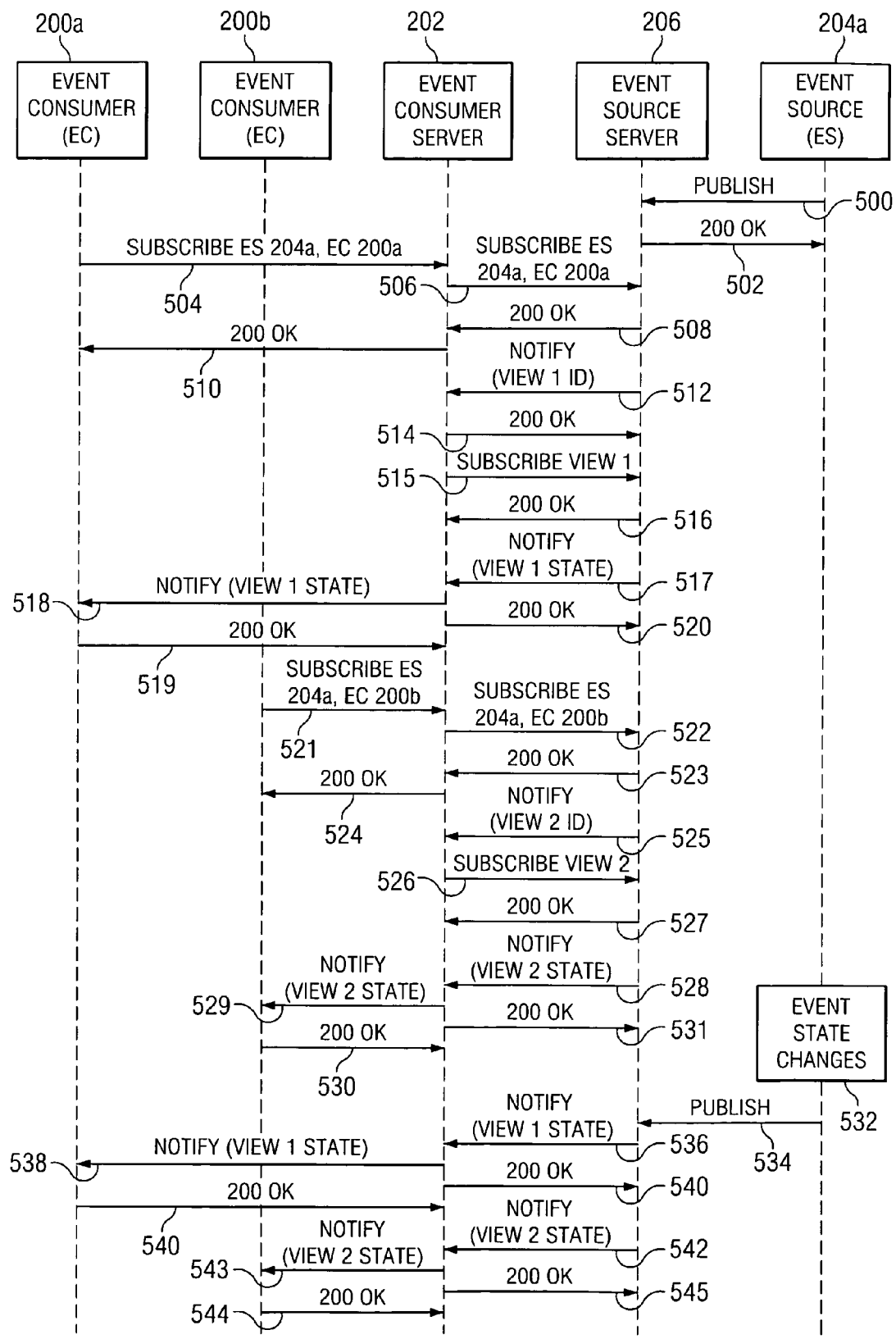
FIG. 5 is a call-flow diagram that illustrates multiple event consumers having subscriptions that result in different views.

FIG. 5 is a call-flow diagram that illustrates multiple event consumers having subscriptions that result in different views. Event source 204a publishes its event state information to event source server 206 at message 500. Event source server 206 confirms the publication by sending a 200OK to event source 204a at message 502. Event consumer 200a desires to receive event state information about event source 204a and sends a subscription request to event consumer server 202 at message 504. Event consumer server 202 forwards the subscription request to event source server 206 at message 506. The subscription request includes the identity of event consumer 200a and event source 204a. The subscription is confirmed when event source server 206 sends a 200OK to event consumer server 202 at message 508, and event consumer server 202 forwards the 200OK to event consumer 200a at message 510. If event consumer 200a is authorized to see the event state of event source 204a, event source server 206 sends a notify message reflecting a view of event source 204a to event consumer server 202 at message 512. The view includes a view identifier of a particular view of event source 204a, which is included in all subsequent notifications of event source 204a when the event state changes. The view identifier may be a universal resource identifier (URI). Event consumer server 202 confirms the notify message by sending a 200OK at message 514 and sends a view subscription request at message 515. Event source server 206 confirms the view subscription at message 516 and sends a notify message that includes the state of event source 204a to event consumer server 202 at message 517. Event consumer server 202 transmits the notify message to event consumer 200a at message 518. Event consumer 200a confirms the notify message by sending a 200OK to event consumer server 202 at message 519. Event consumer server 202 sends the 200OK to event source server 206 at message 520.

Event consumer 200b sends a subscription request to event consumer server 202 at message 521, which sends the subscription request to event source server 206 at message 522. The subscription request includes the identity of event consumer 200b. Event source server 206 confirms the subscription by sending a 200OK to event consumer server 202 at message 523, which sends a 200OK to event consumer 200b at message 524. Event source server 206 determines if event consumer 200b is authorized for the service and if there is a matching view for the event source 204a that event consumer 200b desires to see. In the illustrated embodiment, a matching view does not exist. This may occur if a different filter is applied to event consumer 200a than for event consumer 200b or for any other suitable reason. If event consumer 200b is authorized to see the event state of event source 204a, event source server 206 creates a new view and returns a view identifier that applies to the subscription of event consumer 200b at message 525. The view identifier is included in all subsequent notifications of event source 204a when the event state changes. The view identifier may be a universal resource identifier (URI). Event consumer server 202 sends a view subscription request for event consumer 200b at message 526. Event source server 206 confirms the view subscription at message 527 and sends a notify message that includes the state of event source 204a to event consumer server 202 at message 528. Event consumer server 202 transmits the notify message to event consumer 200b at message 529. Event consumer 200b confirms the notify message by sending a 200OK to event consumer server 202 at message 530, which forwards the 200OK to event source server 206 at message 531.

At instance 532, the event state of event source 204a changes. Event source 204a publishes the event state change to event source server 206 at message 534. Event source server 206 sends the notify message for the first view of the changed event state to event consumer server 202 at message 536. Event consumer server 202 forwards the notify message to event consumer 200a at message 538, which has authorization for the first view. Event consumer 200a confirms the notify message by sending a 200OK to event consumer server 202 at message 540. Event consumer server 202 sends the 200OK to event source server 206 at message 541.

The event state change of event source 204a also affects the second view, to which event consumer 200b is subscribed. Event source server 206 sends a notify message for the second view to event consumer server 202 at message 542, and event consumer server 202 sends the notify message to event consumer 200b at message 543. Each notify message is confirmed by sending a 200OK at message 544 and message 545.

Figure 6:
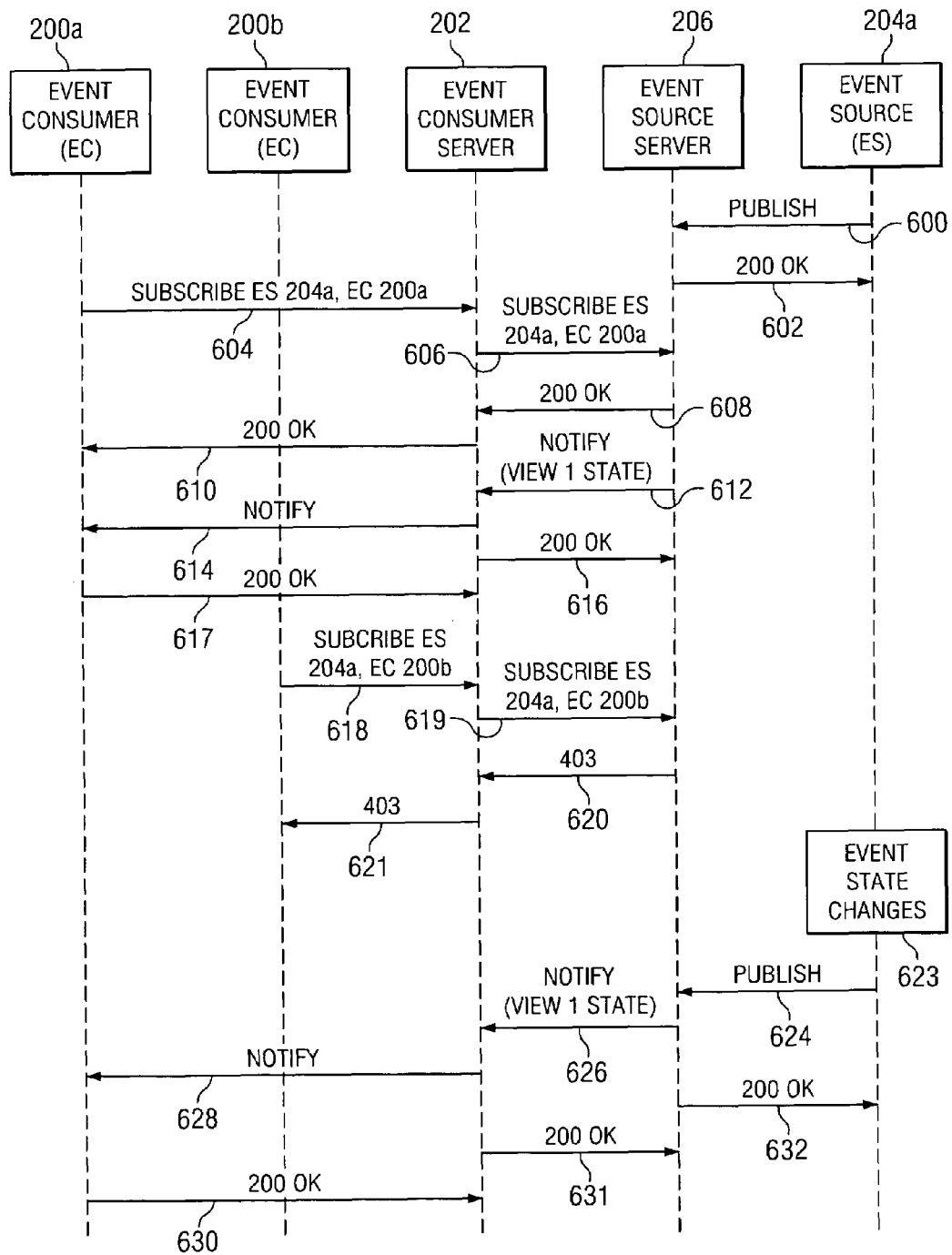
FIG. 6 is a call-flow diagram that illustrates an unauthorized event consumer attempting to obtain a subscription.

FIG. 6 is a call-flow diagram that illustrates an unauthorized event consumer 200 attempting to obtain a subscription. Event source 204a publishes its event state to event source server 206 at message 600. Event source server 206 confirms the publication by sending a 200OK to event source 204a at message 602. Event consumer 200a desires to receive event state information about event source 204a and sends a subscription request to event consumer server 202 at message 604. Event consumer server 202 forwards the subscription request to event source server 206 at message 606. The subscription request includes the identity of event consumer 200a and event source 204a. The subscription is confirmed when event source server 206 sends a 200OK to event consumer server 202 at message 608, and event consumer server 202 forwards the 200OK to event consumer 200*a* at message 610. If event consumer 200*a* is authorized to see the event state of event source 204*a*, event source server 206 sends a notify message reflecting a view of event source 204*a* to event consumer server 202 at message 612. Event consumer server 202 sends a notify message to event consumer 200*a* reflecting the view at message 614. The notify messages are confirmed at message 616 and message 617 with a 200OK sent from event consumer 200*a* to event consumer server 202 and a 200OK sent from event consumer server 202 to event source server 206.

Event consumer 200*b* sends a subscription request to event consumer server 202 at message 618, which forwards the subscription request to event source server 206 at message 619. The subscription request includes the identity of event consumer 200*b*. In the illustrated embodiment, event consumer 200*b* does not have authorization to view the event state of event source 204*a*. Event source server 206 responds with a 403 Forbidden response at message 620 because event consumer 200*b* is unauthorized to view the event state. The response is forwarded to event consumer 200*b* at message 621. Therefore, event consumer 200*b* does not gain access to view the event state of event source 204*a*.

At instance 622, the event state of event source 204*a* changes. Event source 204*a* publishes the event state change to event source server 206 at message 624. Event source server 206 sends the notification message that includes the view identifier of the changed event state to event consumer server 202 at message 626. Event consumer server 202 sends the notify message to event consumer 200*a* at message 628. The publication and notify message is confirmed by event consumer 200, event consumer server 202, and event source server 206 by sending a 200OK at messages 630, 631, and 632.

The call-flow diagram is only an example of an unauthorized event consumer 200 attempting to obtain a subscription. For example, event source 204*a* may change authorization policies after event consumer 200*a* has received a view into the event state of event source 204*a*. Event source server 206 may terminate the view of event consumer 200*a* if the authorization policy changes. As another example, event source 204*a* may update the authorization policy to provide a different view into the event state for event consumers 200. Providing a different view to event consumer 200 may result in a change of the data being delivered. Changes in authorization policy may be reflected in the event state sent as part of the subscription dialog. Additionally, a change of authorization may result if the subscription dialog is terminated.

The flowchart and each call-flow diagram are only exemplary illustrations. Modifications, additions, or omissions may be made to the flowchart and/or call-flow diagrams. In addition, steps and messages may be performed in any suitable manner.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A computer-implemented method for optimizing inter-domain event services, comprising:
receiving a first subscription request at an event source server requesting receipt of an event state of an event source, the event state comprising presence information of a user behaving as the event source;
determining a view associated with the first subscription request;
sending a single notify message to an event consumer server reflecting a first defined view into the event state of the event source that corresponds to the first subscription request;
receiving a second subscription request at the event source server requesting receipt of the event state of the event source;
determining a view associated with the second subscription request;
determining if the first defined view corresponds to the second subscription request;
generating a view identifier to identify the event source, wherein the view identifier is a universal resource identifier;
sending the view identifier;
determining if the event state of the event source changes; and
sending a change notification to the event consumer server if the event state of the event source changes, wherein the change notification includes the view identifier of the event source.

2. The method of claim 1, further comprising:
receiving a first view subscription request to subscribe to the first defined view of the event source.

3. The method of claim 1, further comprising:
reusing the first defined view that corresponds to the first subscription request if the first defined view corresponds to the second subscription request; and
reusing a first view subscription to subscribe to the first defined view of the event source.

4. The method of claim 1, further comprising:
sending a second defined view that corresponds to the second subscription request if the first defined view does not correspond to the second subscription request; and
receiving a second view subscription request to subscribe to the second defined view of the event source.

5. The method of claim 1, further comprising:
collecting one or more change notifications over a time interval;
aggregating the one or more change notifications, wherein the aggregated change notifications include a view identifier; and
sending the one or more change notifications.

6. The method of claim 5, wherein sending the one or more change notifications includes applying a compression algorithm to reduce a size of the aggregated change notifications.

7. The method of claim 1, further comprising sending a notification of a policy change using the first and second subscriptions established by the first and second subscription requests.

8. A system for optimizing inter-domain event services, comprising:
an event source server comprising a processor, the event source server coupled to the one or more event sources and operable to enable one or more event sources to provide event state information;
a plurality of event consumers each operable to subscribe to a defined view to receive the event state information based on subscription requests associated with the one or more event sources;

an event consumer server comprising a processor, the event consumer server coupled to the event source server and the event consumer server operable to enable the plurality of event consumers to subscribe to the one or more event sources, wherein the event source server is further operable:
to receive a first subscription request at the event source server requesting receipt of an event state of the one or more event source, the event state comprising presence information of one or more users behaving as the event sources;
to determine a view associated with the first subscription request; to send a single notify message to the event consumer server reflecting a first defined view into the event state of the event source that corresponds to the first subscription request;
to receive a second subscription request at the event source server requesting receipt of the event state of the event source;
to determine a view associated with the second subscription request;
to determine if the first defined view corresponds to the second subscription request;
to generate a view identifier to identify the event source, the view identifier is a universal resource identifier;
to send the view identifier;
to determining if the event state of the event source changes; and
to send a change notification to the event consumer server that includes the view identifier of the event source if the event state of the event source changes.

9. The system of claim 8, wherein the event source server is operable to:
receive a view subscription from each event consumer to subscribe to a defined view of the event source corresponding to the view identifier.

10. The system of claim 8, further comprising a link operable to couple the event source server and the event consumer server, wherein the link allows a plurality of subscription requests to correspond to a defined view.

11. The system of claim 10, if the defined view being subscribed to correspond to the established defined view, the event source server is operable to reuse the defined view.

12. The system of claim 8, if the defined view being subscribed to does not correspond to the established defined view, the event source server is operable to send a new defined view.

13. The system of claim 8, wherein the event source server is operable to:
collect one or more change notifications of the one or more event sources over a time interval;
aggregate the one or more change notifications that include a view identifier of each event source; and
send the one or more change notifications.

14. The system of claim 13, wherein the event consumer server is operable to send the change notifications of each event source to the plurality of event consumers subscribed to the event state.

15. The system of claim 13, wherein the event source server is operable to apply a compression algorithm to reduce a size of the aggregated change notifications.

16. The system of claim 8, wherein the event source server is operable to send a notification of a policy change using the subscription requests received from the plurality of event consumers.

17. A computer readable medium including logic for optimizing inter-domain event services, the logic operable to:
receive a first subscription request at an event source server requesting receipt of an event state of an event source, the event state comprising presence information of a user behaving as the event source;
determine a view associated with the first subscription request;
send a single notify message to an event consumer sewer reflecting a first defined view into the event state of the event source that corresponds to the first subscription request;
receive a second subscription request at the event source server requesting receipt of the event state of the event source;
determine a view associated with the second subscription request;
determine if the first defined view corresponds to the second subscription request;
generating a view identifier to identify the event source, wherein the view identifier is a universal resource identifier;
sending the view identifier;
determining if the event state of the event source changes; and
sending a change notification to the event consumer server if the event state of the event source changes, wherein the change notification includes the view identifier of the event source.

18. The computer readable medium of claim 17, the logic operable to:
receive a first view subscription request to subscribe to the first defined view of the event source.

19. The computer readable medium of claim 17, the logic operable to:
reuse the first defined view that corresponds to the first subscription request if the first defined view corresponds to the second subscription request; and
reuse a first view subscription to subscribe to the first defined view of the event source.

20. The computer readable medium of claim 17, the logic operable to:
send a second defined view that corresponds to the second subscription request if the first defined view does not correspond to the second subscription request; and
receive a second view subscription request to subscribe to the second defined view of the event source.

21. The computer readable medium of claim 17, the logic operable to:
collect one or more change notifications over a time interval;
aggregate the one or more change notifications, wherein the aggregated change notifications include a view identifier; and
send the one or more change notifications.

22. The computer readable medium of claim 21, wherein the logic operable to send the one or more change notifications includes applying a compression algorithm to reduce a size of the aggregated change notifications.

23. The computer readable medium of claim 17, the logic operable to send a notification of a policy change using the first and second subscriptions established by the first and second subscription requests.

24. A system for optimizing inter-domain event services, comprising:
means for receiving a first subscription request at an event source server requesting receipt of an event state of an event source, the event state comprising presence information of a user behaving as the event source, wherein the event source server comprises a processor;

means for determining a view associated with the first subscription request;

means for sending a single notify message to an event consumer server reflecting a first defined view into the event state of the event source that corresponds to the first subscription request;

means for receiving a second subscription request at the event source server requesting receipt of the event state of the event source;

means for determining a view associated with the second subscription request;

means for determining if the first defined view corresponds to the second subscription request;

means for sending the view identifier;

means for generating a view identifier to identify the event source, wherein the view identifier is a universal resource identifier;

means for determining if the event state of the event source changes; and means for sending a change notification to the event consumer server if the event state of the event source changes, wherein the change notification includes the view identifier of the event source.

* * * * *

UNITED STATES PATENT AND TRADEMARK OFFICE
CERTIFICATE OF CORRECTION

PATENT NO. : 7,607,138 B2  Page 1 of 1
APPLICATION NO. : 11/154974
DATED : October 20, 2009
INVENTOR(S) : Donovan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Twelfth Day of October, 2010

David J. Kappos
*Director of the United States Patent and Trademark Office*